(12) United States Patent
Hemingway et al.

(10) Patent No.: US 7,472,545 B2
(45) Date of Patent: Jan. 6, 2009

(54) ENGINE EXHAUST EMISSION CONTROL SYSTEM PROVIDING ON-BOARD AMMONIA GENERATION

(75) Inventors: Mark D. Hemingway, Columbiaville, MI (US); Brian J. Christopher, Fenton, MI (US); Michael P. Thornton, Lapeer, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/440,930

(22) Filed: May 25, 2006

(65) Prior Publication Data

US 2007/0271908 A1  Nov. 29, 2007

(51) Int. Cl.
*F01N 3/00* (2006.01)
(52) U.S. Cl. .............................. 60/286; 60/287; 60/292; 60/297; 60/301; 60/303; 48/197 R; 48/198.7
(58) Field of Classification Search .................... 60/274, 60/286, 287, 292, 297, 301, 303, 324; 48/197 R, 48/198.7
See application file for complete search history.

(56) References Cited

U.S. PATENT DOCUMENTS

| | | | |
|---|---|---|---|
| 6,655,130 B1 | 12/2003 | Kirwan et al. | |
| 6,832,473 B2 | 12/2004 | Kupe et al. | |
| 6,996,975 B2 * | 2/2006 | Radhamohan et al. | 60/286 |
| 7,093,428 B2 * | 8/2006 | LaBarge et al. | 60/286 |
| 7,117,669 B2 * | 10/2006 | Kaboord et al. | 60/288 |
| 7,188,469 B2 * | 3/2007 | Bonadies et al. | 60/286 |
| 7,213,395 B2 * | 5/2007 | Hu et al. | 60/286 |
| 2004/0146458 A1 | 7/2004 | Weissman et al. | |
| 2005/0022450 A1 | 2/2005 | Tan et al. | |
| 2006/0010859 A1 * | 1/2006 | Yan et al. | 60/286 |

* cited by examiner

*Primary Examiner*—Binh Q. Tran
(74) *Attorney, Agent, or Firm*—Paul L. Marshall

(57) ABSTRACT

An exhaust emission control system that provides on-board ammonia generation includes a valve disposed upstream of the LNT and SCR catalyst that operates to selectively control the flow of engine exhaust gas to an LNT and/or an SCR catalyst; while reformate fuel is being conveyed from a reformer to the LNT, the valve operates to cause the exhaust gas to bypass the LNT and flow directly to the SCR catalyst. The exhaust emission control system further includes a controller provided with an algorithm that monitors engine operating conditions and exhaust gas conditions, estimates the cumulative amount of exhaust gas created by the engine and the amount of NOx stored in the LNT, and calculates the amount of NOx required to be converted to $NH_3$.

8 Claims, 1 Drawing Sheet

ENGINE EXHAUST EMISSION CONTROL SYSTEM PROVIDING ON-BOARD AMMONIA GENERATION

TECHNICAL FIELD

This invention relates generally to engine exhaust systems and more particularly to an exhaust system that provides on-board ammonia generation.

BACKGROUND OF THE INVENTION

Internal combustion engines, including compression ignition engines and spark ignition engines regularly undergo redesign efforts to improve efficiency and enhance fuel economy. Compression-ignition engines and direct-injection spark-ignition engines are gaining in popularity due in part to improved fuel economy, which may exceed 20% improvement compared to a similarly-sized, conventional spark-ignition engine. Compression-ignition engines and direct-injection spark-ignition engines operate with excess air in the combustion process, which is also referred to as operating lean of stoichiometry. An engine that operates lean of stoichiometry can do so without a throttle valve in the air intake manifold. Stoichiometry is an air/fuel ratio at which there is a sufficient amount of oxygen from the air mixed with the fuel to completely oxidize the fuel during combustion. When air can freely flow into the cylinders on an intake stroke of a combustion cycle, less pumping energy is required, leading to a fuel economy benefit. Engines that operate lean of stoichiometry can be classified as heavy-duty diesel, light-duty diesel, and direct-injection gasoline engines. Heavy-duty diesel engines are distinguished from light-duty diesel engines by their application and method for emissions certification. A heavy-duty engine is used in a high-load application, and is typically certified for use using an engine dynamometer, whereas a light-duty engine is used in a passenger vehicle or light truck, and is certified for use on a vehicle dynamometer.

An internal combustion engine is typically configured with sensors that are operable to measure engine performance and an operator's requirement for power, and output devices that are operable to control engine performance. The sensors include, for example, an engine speed sensor, a torque sensor, a pedal position sensor, and a mass air flow sensor. The design and implementation of engine sensors is known to one skilled in the art.

Acceptance of compression-ignition engines and direct-injection spark-ignition engines has been limited due to the inability to comply with increasingly strict emissions regulations. Emissions regulations that are implemented in countries throughout the world include standards for allowable levels of exhaust gas constituents that are output as a result of the combustion process. The primary regulated exhaust gas constituents include hydrocarbons (HC), carbon monoxide (CO), nitrides of oxygen (NOx), and particulate matter (PM). Engine manufacturers meet various emissions regulations by designing engines, engine control systems and exhaust aftertreatment devices to reduce NOx to nitrogen ($N_2$) and oxygen ($O_2$), and to oxidize HC, CO, and carbon and organic portions of the PM to water ($H_2O$) and carbon dioxide ($CO_2$). When compression-ignition engines and direct-injection spark ignition engines operate with a fuel charge that is at an air/fuel ratio that is lean of stoichiometry, the result is low engine-out emissions of CO and HC. However, lean operation also typically results in higher levels of engine-out emissions of NOx and PM.

Engine system developers have sought to reduce NOx and PM emissions of compression-ignition engines and direct-injection spark ignition engines using several different aftertreatment devices and control schemes. The aftertreatment devices include, for example, oxidation catalysts, lean NOx catalysts, NOx adsorber catalysts, diesel particulate traps, oxidation and three-way catalysts, and selective catalytic reduction catalysts. The aftertreatment devices are placed in an exhaust gas feedstream and are used in conjunction with engine management control schemes and added hardware to reduce tailpipe emissions below regulated levels.

As described in U.S. Pat. No. 6,904,752, the disclosure of which is incorporated herein by reference, a NOx adsorber catalyst is an aftertreatment device that typically comprises a ceramic or metal substrate having a washcoat containing noble metals that is able to purify exhaust emissions at elevated temperatures. The washcoat typically contains barium and other alkali metals that adsorb and store NOx while the engine is operating with excess oxygen. The NOx adsorbed by a NOx adsorber catalyst must be periodically desorbed from the catalyst by reduction. If this does not occur, the catalyst eventually becomes saturated, leading to breakthrough of NOx emissions.

Desorption and catalysis of the NOx requires an exhaust gas feedstream that is rich of stoichiometry, preferably with catalyst bed temperatures above 200° C. The temperature of the exhaust gas feedstream also affects the amount of time that is required to reduce NOx adsorbed by the NOx adsorber catalyst. Currently available NOx adsorber catalysts perform optimally when the temperature of the exhaust gas feedstream is in the range of 350-450° C. This exhaust gas temperature range is difficult to achieve with a compression-ignition engine or direct-injection spark ignition engine that is operated under low-speed, light load driving conditions.

Regeneration of the NOx trap can also be achieved through the use of reformate, hydrogen-enriched fuels that can be produced from a variety of sources, including gasoline, diesel, and other liquid or gaseous fuels. On-board reformers for producing hydrogen-enriched reformate fuels are described in, for example, U.S. Pat. Nos. 6,655,130 and 6,832,473 and U.S. Patent Appl. Publ. Nos. 2004/0146458 and 2005/0022450, the disclosures of which are incorporated herein by reference.

Reduction of NOx in the NOx adsorber catalyst comprises having the engine management system change the fuel charge from a lean air/fuel ratio to a rich air/fuel ratio for a predetermined amount of time. When the rich exhaust gas enters the NOx adsorber catalyst, the stored NOx is desorbed from the washcoat and reacts with exhaust gases including CO, hydrogen ($H_2$) and HC in the presence of the noble metals to form water ($H_2O$), carbon dioxide ($CO_2$), and nitrogen ($N_2$). The reduction cycle typically must occur regularly during operation of the engine. The engine management system resumes normal engine operation after reduction is complete. The prior art uses the engine management system to switch the fuel charge from a lean air/fuel ratio to a rich air/fuel ratio by reducing overall air intake or adding fuel during combustion. The reduction of air intake to the combustion cycle is accomplished by a combination of throttling, reduction in boost from a turbocharger, and increase in EGR. These methods adversely affect fuel economy, and potentially also affect engine performance.

The performance of a NOx adsorber catalyst is negatively affected by the presence of sulfur in fuel. Sulfur burns in the combustion process to form sulfates ($SO_2$ and $SO_3$). The NOx adsorber catalyst preferably selects and adsorbs sulfates over NOx. The sulfates are not released and reduced during periodic rich air/fuel ratio operation as readily as NOx is released. As a result, adsorbed sulfates reduce the capacity of the NOx adsorber to adsorb NOx.

Desulfation of the NOx adsorber catalyst requires a periodic excursion of the exhaust gas to high temperatures (catalyst bed temperatures of 650° C.) at a rich air/fuel ratio for an extended period of time, typically requiring minutes of operation. Desulfation must occur periodically over the life of the engine, typically every 3,000 to 10,000 miles or an equivalent number of hours of engine operation, depending on the level of sulfur in the fuel, fuel consumption of the engine, and the NOx storage capacity of the NOx adsorber catalyst.

The prior art also discloses the reduction of NOx emissions using a selective catalytic reduction (SCR) catalyst, an aftertreatment device that includes a catalyst and a system that is operable to inject material such as ammonia ($NH_3$) into the exhaust gas feedstream ahead of the catalyst to reduce the NOx adsorbed by the catalyst. The SCR catalyst, which includes a substrate and a washcoat containing noble metals, is capable of promoting the reduction of NOx by $NH_3$ or urea, which undergoes decomposition in the exhaust to produce $NH_3$.

$NH_3$ or urea selectively combine with NOx to form $N_2$ and $H_2O$ in the presence of the SCR catalyst. The $NH_3$ source must be periodically replenished, and the injection of $NH_3$ into the SCR catalyst requires precise control. Overinjection may cause a release of $NH_3$ into the atmosphere, while underinjection may result in inadequate emissions reduction.

SUMMARY OF THE INVENTION

The present invention is directed to an exhaust emission control system that provides on-board ammonia generation and comprises: a NOx sensor for detecting NOx in exhaust gas from an engine; a lean NOx trap (LNT) for removing and retaining NOx from engine exhaust gas; an on-board reformer for providing reformate fuel to the system; a first conduit for conveying reformate fuel from the on-board reformer to the LNT, where the reformate fuel reacts with NOx retained in the LNT, reducing the NOx and thereby forming $NH_3$; a selective catalytic reduction (SCR) catalyst disposed downstream of the LNT for catalytically reducing NOx; a second conduit by-passing said LNT that conveys said engine exhaust gas to said SCR catalyst; and a valve disposed upstream of the LNT and SCR catalyst. The valve operates to selectively control the flow of engine exhaust gas to the LNT and/or the SCR catalyst; while reformate fuel is being conveyed from the reformer to the LNT, the valve operates to cause the exhaust gas to bypass the LNT and flow directly to the SCR catalyst.

The exhaust emission control system of the present invention further comprises a controller comprising an algorithm that monitors engine operating conditions and exhaust gas conditions, estimates the cumulative amount of exhaust gas created by the engine and the amount of NOx stored in the LNT, and calculates the amount of NOx required to be converted to $NH_3$.

BRIEF DESCRIPTION OF THE DRAWING

The present invention will now be described, by way of example, with reference to the accompanying drawings, in which.

Figure 1:
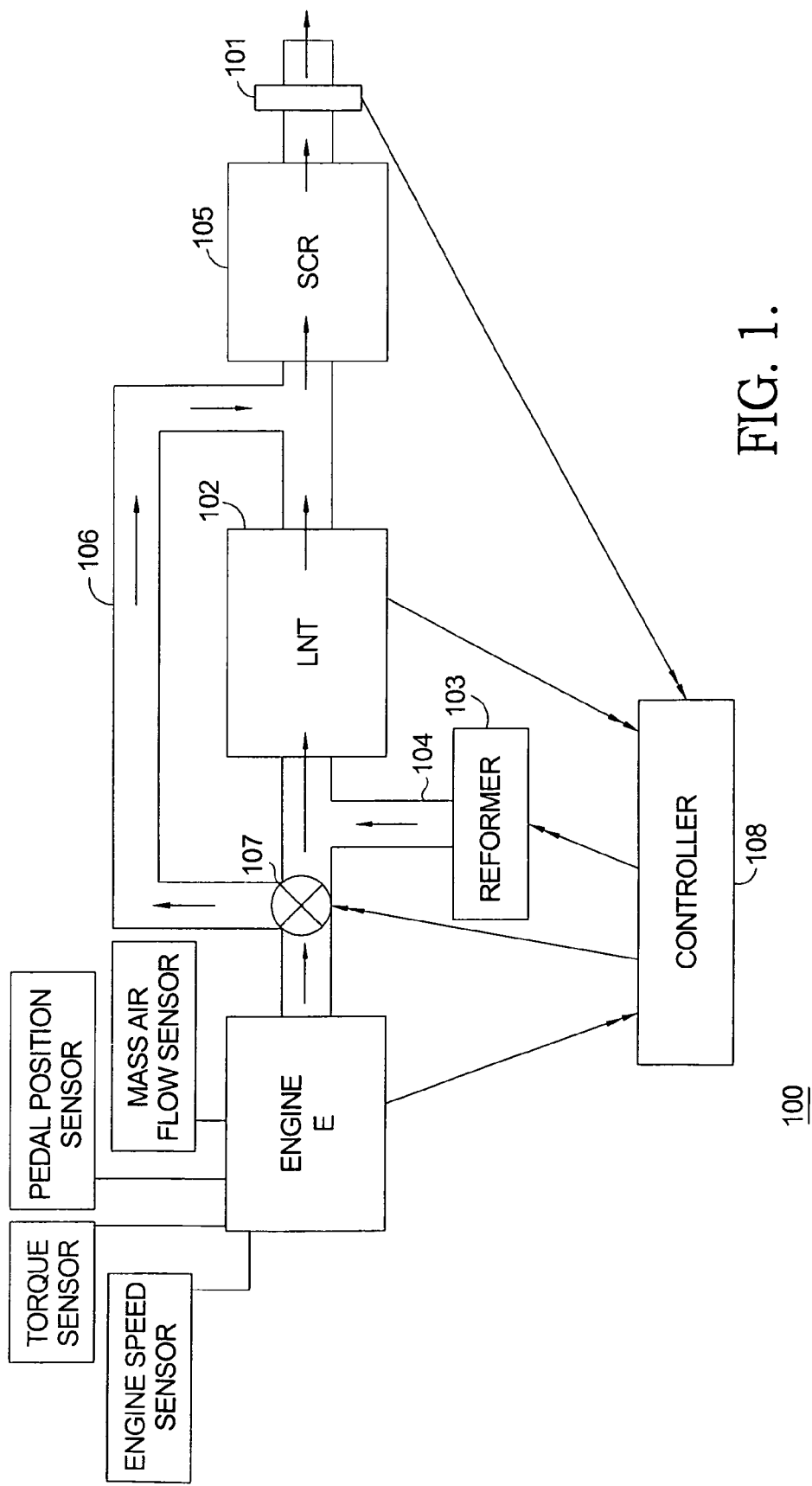
FIG. 1 is a schematic diagram of an exhaust emission control system in accordance with the present invention. It is recognized that the exhaust emission control system may include various other components in addition to those depicted in FIG. 1.

The single-headed arrows in FIG. 1 represent the direction of gas flows through the exhaust emission control system. The double-headed arrows represent input information to the controller from other components of the system, and also output information from the controller to other system components.

DESCRIPTION OF THE PREFERRED EMBODIMENTS

The exhaust emission control system of the present invention provides on-board ammonia generation and includes an upstream 3-way bypass valve, a lean NOx trap (LNT), and a selective catalytic reduction (SCR) catalyst. Reformate from an on-board reformer is injected into the LNT to react with NOx accumulated thereon, converting it to ammonia and thereby regenerating the LNT. During this process of LNT regeneration and accompanying ammonia production, the exhaust flow is directed by the upstream valve around the LNT and into the downstream SCR catalyst. When the valve is repositioned to allow the exhaust to again pass through the LNT, the ammonia generated in the LNT is directed to the SCR catalyst to promote NOx reduction there.

The following chemical reactions occur in the various components of the exhaust emission control system of the present invention:

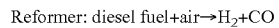
Reformer: diesel fuel+air→$H_2$+CO

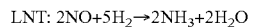
LNT: 2NO+5$H_2$→2$NH_3$+2$H_2O$

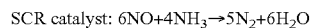
SCR catalyst: 6NO+4$NH_3$→5$N_2$+6$H_2O$

Referring to FIG. 1, a NOx sensor 101 for detecting NOx in exhaust gas generated by an engine E and passing through an exhaust emission control system 100 that includes a lean NOx trap (LNT) 102 for removing and retaining NOx from the engine exhaust gas; an on-board reformer 103 for providing reformate fuel to system 100; and a first conduit 104 for conveying reformate fuel from reformer 103 to LNT 102, where the reformate fuel reacts with NOx retained in LNT 102, reducing the NOx to form $NH_3$ and thereby regenerating LNT 102

A selective catalytic reduction (SCR) catalyst 105 is disposed downstream of LNT 102 for catalytically reducing NOx, and a second conduit 106 by-passes LNT 102, conveying engine exhaust gas directly to SCR catalyst 105, where NOx contained in the exhaust gas is catalytically reduced to $N_2$ by $NH_3$ present in SCR catalyst 105. A valve 107 disposed upstream of LNT 102 and SCR catalyst 105 operates to selectively control the flow of engine exhaust gas to LNT 102 and/or to SCR catalyst 105; while reformate fuel is being conveyed from reformer 103 to LNT 102, valve 107 operates to cause the exhaust gas to bypass LNT 102 and flow directly to SCR catalyst 105 via second conduit 106. Upon cessation of reformate fuel flow to LNT 102, valve 107 is returned to its normal operating position, allowing the exhaust gas to pass through LNT 102 enroute to SCR catalyst 105.

Although NOx sensor 101 is depicted in FIG. 1 as immediately following SCR catalyst 105, alternatively it may be located immediately following LNT 102. In addition, an ammonia sensor (not shown) may be located immediately following SCR catalyst 105.

A controller 108 operates to monitor engine operating conditions and exhaust gas conditions, typically through use of various sensors in engine E and exhaust system 100, including LNT 102, and thereby estimate the cumulative amount of exhaust gas created by engine E and the amount of NOx stored in LNT 102. Controller 108 further operates to determine the amount of reformate fuel from reformer 103 that is required to regenerate LNT 102 at a particular time, as well as the time interval between successive introductions of the reformate fuel into LNT 102 to meet specified emission requirements.

Controller 108 comprises an algorithm that utilizes adaptive or "learning" memory, which allows for production variations and tolerance stack up as well as aging of the engine components. Using sensors such as those described above, controller 109 monitors engine operating conditions and exhaust gas conditions, in particular, NOx concentration as monitored by NOx sensor 101. "Feedback" related to the engine operating conditions is provided by the NOx sensor to the algorithm in a "closed-loop." Should those operating conditions be repeated, the algorithm will have "learned" what the NOx level is through its memory of the previous experience. These "learned" values are maintained in "keep alive" memory even during engine shut down, ensuring that NOx calculations do not have to be "re-learned" at every start.

The algorithm enables the cumulative amounts of NOx and other exhaust gas constituents to be estimated. This estimate can be combined with information about the storage capacity and the operating temperature of the LNT to determine when it will likely become saturated, or otherwise cause exhaust emissions to exceed regulated levels. In addition, the algorithm is capable of determining the amount of NOx required to be converted to ammonia, the amount of reformate fuel needed to regenerate the LNT, and the interval between introduction of reformate fuel into the LNT to meet emission regulation requirements.

The regeneration requirements of LNT 102 depend on its effective size, which in turn depends on the temperature at which it operates. Preferably, the reformate fuel is delivered from reformer 103 to LNT 102 in discrete portions, i.e., with a high flow rate for a short period of time, repeated at intervals. Because the flow of exhaust gas must by-pass LNT 102 during the delivery of reformate fuel, ramp up/down delays must be taken into account in the operation of valve 107.

During regeneration of the LNT and the accompanying production of ammonia, a portion of the NOx stored therein may escape without undergoing conversion to ammonia. This occurrence would have a twofold effect on the ability of the SCR catalyst to convert NOx: 1) less ammonia would be available for NOx reduction in the SCR catalyst, and 2) the unconverted NOx from the LNT would further deplete the SCR catalyst. This situation is exacerbated at temperatures both above and below about 250° C., as peak system efficiency of about 80% NOx conversion is only achievable within a narrow operating temperature window. Both the narrow operating window and the maximum of 80% conversion results in unacceptable performance in governmental regulated emissions. Additional reformate via more frequent regeneration would not improve the situation. Another problem that is encountered is the poisoning over time of the LNT by sulfur contained in the fuel. This poisoning can be reversed by running the system at high temperature (>550° C.) and a rich schedule, but this requires consumption of a high amount of refomate, which can be deleterious to the durability of the catalyst in the LNT.

In accordance with the present invention, the efficiency of NOx reduction is greatly enhanced by optimal control of reformate fuel generation, LNT regeneration time and interval, and exhaust flow and temperature. The effective operating temperature window of the LNT is greatly expanded, with NOx reduction greater than 80% being achieved over the temperature range of about 225-485° C. and above 90% in the 250-375° C. temperature range.

Also In accordance with the present invention, reformate consumption, which negatively effects fuel economy, is substantially reduced but is still sufficient to promote desulfurization at the operating temperatures employed, thereby avoiding the need for a separate desulfurization schedule.

A NOx adsorber catalyst preferably comprises a ceramic substrate having a washcoat that contains a sufficient amount of noble metals to effectively adsorb NOx emissions. The noble metals for the NOx adsorber catalyst include rhodium, platinum, and palladium. The washcoat contains sufficient quantities of barium and other alkali metals to adsorb and store NOx while the engine is operating with excess oxygen. A typical NOx adsorber catalyst is able to adsorb NOx at catalyst bed temperatures above 150° C., preferably above 200° C. The NOx stored in the NOx adsorber catalyst must be periodically reduced, which entails desorption and catalytic reduction of the NOx emissions by $NH_3$. Desorption of NOx from the NOx catalyst occurs at catalyst bed temperatures above 170° C. Catalysis of NOx emissions occurs at catalyst bed temperatures in excess of 200° C., preferably above 250° C. Design considerations include, for example, substrate cell density, cross-section area, volume and location relative to the engine, and washcoat and noble metal content. One skilled in the art is able to design an NOx adsorber catalyst to match the requirements of the engine and exhaust gas feedstream.

While the invention has been described by reference to various specific embodiments, it should be understood that numerous changes may be made within the spirit and scope of the inventive concepts described. Accordingly, it should be recognized that the invention is not limited to the described embodiments but has full scope defined by the language of the following claims.

What is claimed is:

1. An engine exhaust emission control system providing on-board ammonia generation, said system comprising:
    a NOx sensor for detecting NOx in exhaust gas from an engine;
    a lean NOx trap (LNT) for removing and retaining NOx from said engine exhaust gas;
    an on-board reformer for providing reformate fuel to said system;
    a first conduit for conveying reformate fuel from said on-board reformer to said LNT, said reformate fuel reacting with NOx retained in said LNT, reducing said NOx and thereby forming $NH_3$;
    a selective catalytic reduction (SCR) catalyst disposed downstream of said LNT for catalytically reducing NOx;
    a second conduit by-passing said LNT for conveying said engine exhaust gas to said SCR catalyst;
    a valve disposed upstream of said LNT and said SCR catalyst, said valve operating between a first position and a second position to selectively control the flow of said engine exhaust gas, said first position directs said engine exhaust gas through said LNT and said SCR catalyst, said second position directs said engine exhaust gas through said second conduit to by-pass said LNT; and
    a controller comprising an algorithm that monitors engine operating conditions and exhaust gas conditions, estimates the cumulative amount of exhaust gas created by said engine and the amount of NOx stored in said LNT, and calculates the amount of NOx required to be converted to $NH_3$;
    wherein, while reformate fuel is being conveyed from said reformer to said LNT, said valve is in said second position to cause said exhaust gas to bypass said LNT and flow directly to said SCR catalyst.

2. The engine exhaust emission control system of claim 1, wherein said controller further operates to determine an amount of reformate fuel required to regenerate said LNT, thereby producing $NH_3$, and a time interval between successive introductions of said reformate fuel into said LNT to meet specified emission requirements.

3. The engine exhaust emission control system of claim 1, wherein said engine operating conditions are monitored by sensors.

4. The engine exhaust emission control system of claim 3, wherein said sensors are selected from the group consisting of an engine speed sensor, a torque sensor, a pedal position sensor, a mass air flow sensor, and combinations thereof.

5. The engine exhaust emission control system of claim 1, wherein said LNT has an operating temperature of about 225° C. to about 485° C.

6. The engine exhaust emission control system of claim 5, wherein said LNT has an operating temperature of about 250° C. to about 375° C.

7. An engine exhaust emission control system providing on-board ammonia generation, said system comprising:
- a NOx sensor for detecting NOx in exhaust gas from an engine exhaust stream;
- a lean NOx trap (LNT) for removing and retaining NOx from said exhaust gas;
- an on-board reformer for providing reformate fuel to said system, wherein said reformer is off-line from said engine exhaust stream;
- a first conduit for conveying reformate fuel from said on-board reformer to said LNT, said reformate fuel reacting with NOx retained in said LNT, reducing said NOx and thereby forming $NH_3$;
- a selective catalytic reduction (SCR) catalyst disposed downstream of said LNT for catalytically reducing NOx;
- a second conduit by-passing said LNT for conveying said engine exhaust gas to said SCR catalyst;
- a valve disposed upstream of said LNT and said SCR catalyst, said valve operating to selectively control the flow of said engine exhaust gas to said LNT and/or said SCR catalyst; and
- a controller comprising an algorithm that monitors engine operating conditions and exhaust gas conditions, estimates the cumulative amount of exhaust gas created by said engine and the amount of NOx stored in said LNT, and calculates the amount of NOx required to be converted to $NH_3$;

wherein, while reformate fuel is being conveyed from said reformer to said LNT, said valve operates to cause said exhaust gas to bypass said LNT and flow directly to said SCR catalyst.

8. An engine exhaust emission control system providing on-board ammonia generation, said system comprising:
- a NOx sensor for detecting NOx in exhaust gas from an engine;
- a lean NOx trap (LNT) for removing and retaining NOx from said engine exhaust gas;
- an on-board reformer for providing reformate fuel to said system;
- a first conduit for conveying reformate fuel from said on-board reformer to said LNT, said reformate fuel reacting with NOx retained in said LNT, reducing said NOx and thereby forming $NH_3$;
- a selective catalytic reduction (SCR) catalyst disposed downstream of said LNT for catalytically reducing NOx;
- a second conduit by-passing said LNT for conveying said engine exhaust gas to said SCR catalyst;
- a valve disposed upstream of said LNT and said SCR catalyst, said valve operating between a first position and a second position to selectively control the flow of said engine exhaust gas, said first position directs said engine exhaust gas through said LNT and said SCR catalyst, said second position directs all of said engine exhaust gas entering said valve through said second conduit to by-pass said LNT; and
- a controller comprising an algorithm that monitors engine operating conditions and exhaust gas conditions, estimates the cumulative amount of exhaust gas created by said engine and the amount of NOx stored in said LNT, and calculates the amount of NOx required to be converted to $NH_3$;

wherein, while reformate fuel is being conveyed from said reformer to said LNT, said valve is in said second position to cause all of said exhaust gas entering said valve to bypass said LNT and flow directly to said SCR catalyst.

* * * * *